United States Patent
Saitoh et al.

[15] 3,672,656
[45] June 27, 1972

[54] MULTI-LEAF SPRING FOR AUTOMOTIVE SUSPENSION

[72] Inventors: Kohichi Saitoh; Nobuo Ohkubo; Katsunobu Sobajima; Takeshi Hirano, all of Yokohama, Japan

[73] Assignees: Nissan Motor Company, Limited; Nippon Hatsujo Company, Limited, Yokohama, Japan

[22] Filed: July 27, 1970

[21] Appl. No.: 58,513

[30] Foreign Application Priority Data

Aug. 1, 1969 Japan..................................44/72655

[52] U.S. Cl..............................................................267/47
[51] Int. Cl................................................................F16f 1/20
[58] Field of Search............................................267/47, 49

[56] References Cited

UNITED STATES PATENTS

| | | | |
|---|---|---|---|
| 2,882,043 | 4/1959 | Benz | 267/47 |
| 2,355,801 | 8/1944 | Hildenbrand | 267/49 |
| 2,270,516 | 1/1942 | Dow | 267/49 |

Primary Examiner—James B. Marbert
Attorney—McCarthy, Depaoli & O'Brien

[57] ABSTRACT

A multi-leaf spring for an automotive suspension, consisting essentially of a master leaf supporting the frame structure of the vehicle body, an auxiliary leaf underlying the master leaf and secured thereto by a center bolt, at least two removable inserts interposed between those overlapping portions of the two leaves which are remote from the central portions of the leaves, and a central fixed inset interposed between and fixedly secured to the leaves, the spring thus constructed being adapted to eliminate practically all the modes of vibration and to be removed readily and economically when worn.

1 Claim, 5 Drawing Figures

PATENTED JUN 27 1972 3,672,656
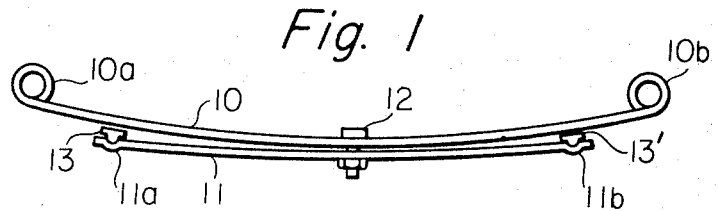
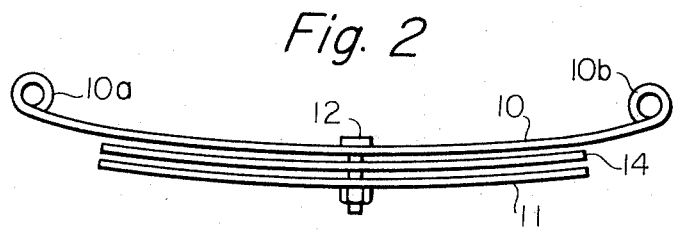
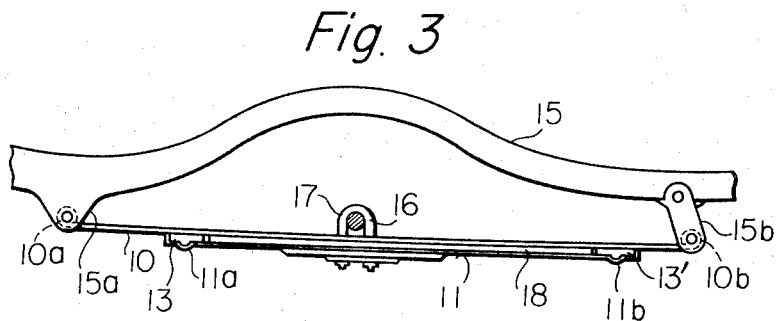
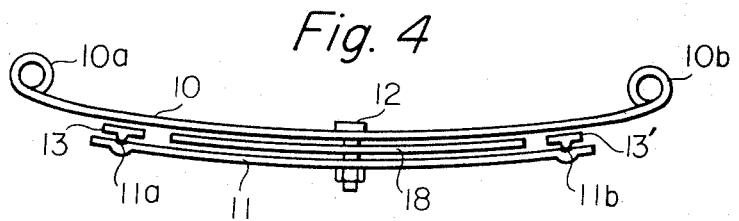
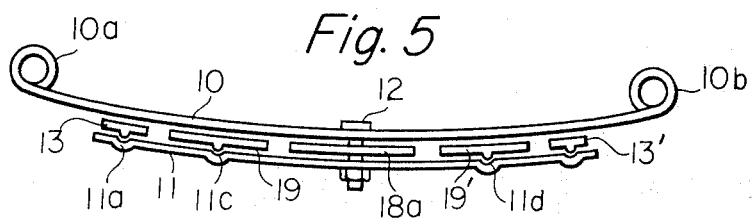
INVENTORS
KOHICHI SAITOH, NOBUO
OHKUBO, KATSUNOBU
BY SOBAJIMA & TAKESHI HIRANO
McCarthy, Leopold & O'Brien
ATTORNEYS

MULTI-LEAF SPRING FOR AUTOMOTIVE SUSPENSION

This invention relates to an automotive suspension and, more particularly, to a multi-leaf spring of the automotive suspension.

The multi-leaf spring to which the invention is directed includes a master leaf which is operatively connected to the frame structure of the vehicle body through its rounded end portions and an auxiliary leaf underlying the master leaf. The two leaves, or plates, are held together at the center by a center bolt which passes through holes in the leaves. The spring in its entirety is supported on the wheel axle of the vehicle by means of a U-bolt, as customary.

The leaves arranged in this manner are caused to slip in the lengthwise direction against each other when they are wound and rebounded because the individual leaves remain the same lengths. In order to permit the leaves to slip smoothly against each other, it is put into practice to interpose one or more inserts between the overlapping portions of the two opposite leaves. The inserts serve not only to absorb the mechanical energy resulting from the upward and downward movements of the leaves but to vary the frequencies of the lower modes of vibration of the leaves thereby to modify the frequencies of the vibration to be carried to the vehicle body.

A difficulty is encountered by the spring of this type in that, since the spring in itself is wound and rebounded in different manners for the different modes of vibration, the leaves are not capable of acting upon all of such different modes of vibration even though the leaves are provided with the inserts. Moreover, when the leaves are caused to slip against each other as they bend during operation, then the inserts between the leaves are subjected to mechanical friction and consequently to wear and abrasion. This means that the inserts should be exchanged with new ones from time to time. Because, in this instance, the slippage between the leaves occurs at a greater distance at a portion remoter from the central portion, the inserts of the type which is substantially coextensive with the overlapping portions of the leaves and which is fastened fixedly to the leaves can not be removed unless the spring as a whole is disassembled. This will be reflected by an increase in the cost of maintenance and servicing.

An object of this invention is, therefore, to provide a multi-leaf spring of the type which is capable of acting on substantially any mode of vibration.

Another object is to provide a multi-leaf spring which is economical in maintenance and servicing.

A further object is to provide a multi-leaf spring having inserts which are easy and economical to be removed, when found worn, with new ones.

In order to achieve such objects of the invention, it is herein proposed to provide three or more inserts between the overlapping portions of the two, master and auxiliary, leaves. At least two of the at least three inserts are interposed removably between those two overlapping portions which are remote from the central portions of the leaves and only one of the inserts is fixedly fastened centrally to the leaves, with the result that the inserts excepting the central fixed one can be removed easily. The inserts thus interposed between the two leaves are preferably made of materials which are different not only from the leaves but from each other, so that the resultant multi-leaf spring is capable of eliminating practically all the modes of vibration.

In the drawings:

FIGS. 1 and 2 are side elevations of representative examples of the multi-leaf spring of the described conventional type;

FIG. 3 is side elevation of a multi-leaf spring embodying this invention, the spring being shown as mounted on a frame structure of the vehicle body;

FIG. 4 is a side elevation, on an enlarged scale, of the spring illustrated in FIG. 3; and FIG. 5 is a side elevation of a modification of the spring shown in FIGS. 3 and 4.

First referring to FIG. 1, the multi-leaf spring of the described conventional type essentially includes a main or master leaf 10 having end portions 10a and 10b which are rounded to support a frame structure (not herein shown) of the vehicle body. The master leaf 10 is underlaid by an auxiliary leaf 11 which is substantially centrally jointed to the master leaf 10 by means of a center bolt 11 passing through holes (not identified by numeral) in the two leaves. The underlying auxiliary leaf 11 has formed at its end portions two depressions 11a and 11b, as illustrated. The depressions 11a and 11b receive therein inserts or liners 13 and 14', respectively, which are made of a material differing from the material of the master and auxiliary leaves 10 and 11 which are usually made of spring steel. The inserts or liners 13 and 13' serve, as previously noted, to reduce the vibrations transferred to the spring and to permit the leaves 10 and 11 to slip easily against each other during operation.

The inserts to be interposed between the master and auxiliary leaves 10 and 11 for this purpose may be arranged in such a manner as to extend substantially coextensively with the overlapping portions of the leaves as sometimes practiced, a typical example being illustrated in FIG. 2.

As shown in FIG. 2, the master and auxiliary leaves 10 and 11, respectively, have interposed therebetween a unitary insert or interleaf member 14, which extends substantially coextensively with the overlapping portions of the two leaves and which is rigidly secured to the leaves by a center bolt 12. The insert 14 of this type is, as will be readily understood, difficult to remove from the leaves because the insert can not be removed unless the spring in its entirety is disassembled. The removal of the whole insert member in this manner is, in another respect, uneconomical because only the end portions thereof are worn with the remaining (central) portion left in a still sound state. Because, moreover, the insert 14 of the spring shown in FIG. 2 is constructed as a unitary member, the spring is not effective on different modes of vibration and, as such, is not capable of eliminating all the modes of vibration.

The difficulties experienced in the multi-leaf springs of the described conventional types can be overcome through incorporation thereinto of the improvements proposed by this invention, an example of the improved springs being illustrated in FIGS. 3 and 4.

In FIG. 3, the spring of the improved type is shown as mounted to a frame structure 15 of the vehicle body in a usual manner.

As shown, the spring has a master leaf 10 and an underlying auxiliary leaf 11, similarly to the conventional counterparts. The overlying master leaf 10 is mounted on a frame structure 15 of the vehicle body through rounded end portions 10a and 10b of the leaf and spring hangers 15a and 15b. The auxiliary leaf 11 is substantially centrally jointed to the master leaf 10 by a suitable fastening means such as a center bolt 12 (FIG. 4) which passes through holes (not identified by numeral) formed in the leaves. The leaves 10 and 11 are supported by a wheel axle 16 through a U-bolt 17 secured to the auxiliary leaf 11, as illustrated.

The auxiliary leaf 11 has formed at its end portions two inner depressions 11a and 11b, as clearly seen in FIG. 4. The depressions 11a and 11b receive therein removable inserts or liners 13 and 13' which are interposed between the overlapping end portions of the leaves 10 and 11, similarly to the prior art spring shown in FIG. 1. Different from the spring of FIG. 1, the leaves 10 and 11 have interposed therebetween an additional fixed insert 18, which intervenes between the outer inserts 13 and 13' and which is substantially centrally secured to the master and auxiliary leaves 10 and 11, respectively, by means of the center bolt 12.

In this embodiment of the spring according to this invention, the outer removable inserts 13 and 13', which are subjected to wear more seriously than the fixed central leaf 18 is, can be readily removed from the leaf 11 because they are removably captured by the depressions 11a and 11b, respectively.

The outer removable inserts 13 and 13' and the additional fixed insert 18 are made of a material or materials that are different from the material of the leaves 10 and 11 which are usually made of spring steel. By preference, the additional fixed insert 18 may be made of a material which is different from the material of the outer removable inserts so that different modes of vibration can be eliminated by the spring with increased efficiency.

If preferred, furthermore, more than two removable inserts may be interposed between the overlapping portion of the leaves 10 and 11, an example being illustrated in FIG. 5.

In the modification of the multi-leaf spring illustrated in FIG. 5, two inner depressions 11c and 11d are formed on the auxiliary leaf 11, in addition to the depressions 11a and 11b. These additional depressions 11c and 11d receive removable inserts 19 and 19' which are interposed between the leaves 10 and 11 inboardly of the outer removable inserts 13 and 13'. A central fixed insert 18a is interposed fixedly between the leaves 10 and 11 and secured in position by the center bolt 12.

The use of such an increased number of removable inserts will prove advantageous because an increased number of inserts can be removed from the spring when worn and because the spring can act upon an increased number of modes of vibration.

The additional inserts 19 and 19' may preferably be made of a material different from the materials of the outer removable inserts 13 and 13' and the central fixed insert 18' for the reason previously noted.

It should, in this instance, be borne in mind that, although the removable inserts are shown in FIG. 5 as four in number, a still increased number of removable inserts may be used if desired.

What is claimed is:

1. A multi-leaf spring of an automotive suspension, comprising a master leaf supporting the frame structure of the vehicle body, an auxiliary leaf substantially centrally jointed to said master leaf by a center bolt, at least two removable inserts interposed between those overlapping portions of said master and auxiliary leaves which are remote from the central portions of said leaves, and a fixed insert fixedly interposed between the central overlapping portions of said leaves and intervening between said removable inserts, said removable and fixed inserts being made of materials which are different not only from said master and auxiliary leaves but from each other, whereby said multi-leaf spring is capable of eliminating all modes of vibrations.

* * * * *